United States Patent
Labrador et al.

(10) Patent No.: US 7,512,079 B2
(45) Date of Patent: Mar. 31, 2009

(54) SYSTEM AND METHOD TO ASSURE NODE CONNECTIVITY IN AN AD HOC NETWORK

(75) Inventors: Miguel A. Labrador, Tampa, FL (US); Venkatesh Ramarathinam, Annandale, VA (US)

(73) Assignee: University of South Florida, Tampa, FL (US)

( * ) Notice: Subject to any disclaimer, the term of this patent is extended or adjusted under 35 U.S.C. 154(b) by 623 days.

(21) Appl. No.: 11/161,272

(22) Filed: Jul. 28, 2005

(65) Prior Publication Data
US 2006/0023677 A1    Feb. 2, 2006

Related U.S. Application Data

(60) Provisional application No. 60/591,761, filed on Jul. 28, 2004.

(51) Int. Cl.
*H04L 12/28* (2006.01)
(52) U.S. Cl. .................................... 370/254
(58) Field of Classification Search ............. 370/252, 370/254, 255, 312, 315, 332, 338; 455/134, 455/436, 522, 561
See application file for complete search history.

(56) References Cited

U.S. PATENT DOCUMENTS

| | | | |
|---|---|---|---|
| 6,377,805 B1* | 4/2002 | Anvekar et al. | 455/436 |
| 6,735,448 B1* | 5/2004 | Krishnamurthy et al. | 455/522 |
| 2002/0191573 A1* | 12/2002 | Whitehill et al. | 370/338 |
| 2003/0065256 A1* | 4/2003 | Rubinstenn | 600/407 |
| 2003/0163554 A1* | 8/2003 | Sendrowicz | 709/220 |

* cited by examiner

*Primary Examiner*—Chirag G Shah
*Assistant Examiner*—Yong Zhou
(74) *Attorney, Agent, or Firm*—Molly L. Sauter; Smith & Hopen P.A.

(57) ABSTRACT

In accordance with the present invention is provided, a method to assure node connectivity in an ad hoc wireless network comprising a wireless main controller, a plurality of wireless nodes having a plurality of neighboring nodes and a plurality of wireless links connecting the wireless main controller, the plurality of wireless nodes and the plurality of neighboring nodes. The proposed method includes, computing a composite threshold for each of a plurality of neighboring nodes of a plurality of nodes, assigning a mobility to each of the plurality of nodes based on the composite threshold for each of the plurality of neighboring node and using the mobility assigned to each of the plurality of nodes to assure node connectivity in the ad hoc network.

33 Claims, 16 Drawing Sheets

Fig. 4

| Neighbor ID | Normalized Signal Strength | Normalized Energy | Composite Composite |
|---|---|---|---|
| 2 | 0.51 | 0.92 | 0.4692 |
| 3 | 0.57 | 0.81 | 0.4617 |
| 4 | 0.63 | 0.73 | 0.289 |
| 5 | 0.56 | 0.82 | 0.4592 |
| BS | 0.45 | 0.91 | 0.4095 |

Fig. 6

| NODE 1 | | | NODE 2 | | |
|---|---|---|---|---|---|
| Neighbor ID | Energy level | Signal Power | Neighbor ID | Energy level | Signal Power |
| 2 | 0.95 | 0.9 | 1 | 0.95 | 0.87 |
| BS | 0.96 | 0.92 | BS | 0.93 | 0.9 |

Fig. 7

| NODE 1 | | NODE 2 | |
|---|---|---|---|
| Neighbor ID | Composite Threshold | Neighbor ID | Composite Threshold |
| 2 | 0.925 | 1 | 0.91 |
| BS | 0.94 | BS | 0.915 |

Fig. 8

| Node ID | Neighbor ID | Composite Threshold | Mobile |
|---|---|---|---|
| 1 | 2 | 0.925 | Yes |
|   | BS | 0.94 |  |
| 2 | 1 | 0.91 | Yes |
|   | BS | 0.915 |  |

Fig. 10

| NODE 1 | | | NODE 2 | | |
| --- | --- | --- | --- | --- | --- |
| Neighbor ID | Energy level | Signal Power | Neighbor ID | Energy level | Signal Power |
| 2 | 0.75 | 0.85 | 1 | 0.72 | 0.8 |
| BS | 0.8 | 0.2 | BS | 0.8 | 0.1 |

Fig. 11

| NODE 1 | | NODE 2 | |
|---|---|---|---|
| Neighbor ID | Composite Threshold | Neighbor ID | Composite Threshold |
| 2 | 0.83 | 1 | 0.784 |
| BS | 0.32 | BS | 0.24 |

Fig. 12

| Node ID | Neighbor ID | Composite Threshold | Mobile |
|---|---|---|---|
| 1 | 2 | 0.83 | Yes |
|  | BS | 0.32 |  |
| 2 | 1 | 0.784 | Yes |
|  | BS | 0.24 |  |

Fig. 14

| NODE 1 | | | NODE 2 | | |
|---|---|---|---|---|---|
| Neighbor ID | Energy level | Signal Power | Neighbor ID | Energy level | Signal Power |
| 2 | 0.5 | 0.4 | 1 | 0.3 | 0.328 |
| BS | 0.6 | 0.2 | | | |

Fig. 15

| NODE 1 | | NODE 2 | |
|---|---|---|---|
| Neighbor ID | Composite Threshold | Neighbor ID | Composite Threshold |
| 2 | 0.28 | 1 | 0.32 |
| BS | 0.32 | | |

Fig. 16

| Node ID | Neighbor ID | Composite Threshold | Mobile |
|---|---|---|---|
| 1 | 2 | 0.28 | No |
|  | BS | 0.32 |  |
| 2 | 1 | 0.32 | Yes |

|  | NODE 1 |  | ij |  | NODE 2 |  |
|---|---|---|---|---|---|---|
| Neighbor ID 2 | Compo | site Threshold 0.28 | 1 Neig | hhor ID 1 | Compos | ite Threshold u32 |
| BS |  | 0.32 |  |  |  |  |

SYSTEM AND METHOD TO ASSURE NODE CONNECTIVITY IN AN AD HOC NETWORK

CROSS REFERENCE TO RELATED APPLICATIONS

This application claims priority to U.S. Provisional Patent Application No. 60/591,761, "A Control Layer Algorithm for Ad hoc Networks in Support of Urban Search and Rescue (USAR) Applications", filed Jul. 28, 2004.

BACKGROUND OF INVENTION

The world has witnessed a tremendous growth in the deployment of wireless network technology driven by the need for ubiquitous service and rapid developments in telecommunications infrastructure. Mobile hosts such as notebook computers, featuring powerful CPUs and gigabytes of disk space are now easily affordable and becoming quite common in everyday life. At the same time, huge improvements have been made in wireless network hardware, and efforts are being made to integrate the two into a meaningful resource such as the Internet. We are witness to large scale proliferation of mobile computing and wireless technology in our day-to-day lives in the form of various hardware interfaces and technology devices, running numerous applications catering specifically to wireless technology. The use of cell phones and PDA's for mobile video conferencing, GPS based tracking systems and remote wireless sensor surveillance gives us an indication of the growth and proliferation of wireless technology in today's world.

The increased demand and usage of mobile devices, directly correlates to the inflated demand for mobile data and Internet services. The number of subscribers to wireless data services is predicted to reach 1.3 billion by end of 2004, and the number of wireless messages is sent per month is predicted to reach 244 billion by December 2004. But these devices and technology use the standard wireless network model of a base station, repeaters, access points, and wireless nodes. Oftentimes however mobile users will want to communicate in situations in which no fixed wired infrastructure is available, because it may not be possible to provide the necessary infrastructure or because the expediency of the situation does not permit this installation. The term, "ad hoc network" refers to such a collection of wireless mobile hosts forming a temporary network without the aid of any established infrastructure or centralized administration.

The history of ad hoc networks dates back to the DARPA radio packet network in 1972, which was primarily inspired by the efficiency of the packet switching technology, such as bandwidth sharing and store and forward routing, and its possible application in mobile wireless environment. But, it was not until the early 90's when research in the area of ad hoc networks gained significant momentum and widespread attention. This could be attributed to the surge in cheap availability of network hardware, the micro computer revolution, and the increasing number of applications that required an ad hoc network kind of setup. Some of the common applications for ad hoc networks include: conference halls, classrooms, search and rescue operations, vehicular communication, wireless surveillance and military operations. In an ad hoc network, every node acts as a router, and forwards packets towards the destination. It is a self-organized network where every node cooperates to provide connectivity and services.

MANET's or Mobile Ad hoc Networks have gained significant momentum as they are the solution for providing network services to mobile users at places where there is no infrastructure or an existing infrastructure needs wireless extensions. Wireless Mobile Ad Hoc Networks (MANETs) are very well suited to substitute current 802.11 Wireless Local Area Networks in practical implementations of semi-autonomous ground robots in Urban Search and Rescue (USAR) operations. MANETs are infrastructureless, self-configurable and self-forming networks with multi-hop capabilities, all very important features for USAR applications. However, node mobility may still cause partitions in the network topology, isolating robots from the network or even losing them, hindering the mission's success.

Urban Search and Rescue (USAR) focuses on locating life and resources in collapsed buildings or disaster sites affected by artificial or natural calamities. These disaster sites pose several situational hazards that drastically affect the efficiency of human rescue teams. Disaster sites are inherently unsafe, and movement inside these sites is extremely restricted due to the availability of only small or no entry voids to explore the rubble. Vibrations might further affect the foundation of the collapsed construction and could trigger a secondary collapse. Disaster sites are usually contaminated by water/sewage distribution systems, toxic gas spills, body fluids and other hazardous materials and gases. All of the above mentioned factors make it imperative to look for other effective means to carry out rescue operations. The use of mobile robots provides an effective alternative for improved efficiency in USAR operations. Due to smaller sizes and robust design, robots can explore disaster sites that pose numerous hazard threats and are not conducive for exploration by relief workers.

In USAR operations, and in general, in Safety, Security and Rescue (SSR) operations, a group of semi-autonomous ground vehicles is sent out to perform a determined mission under the guidance of the main controller, such as surveying a disaster site for life and resources. The success of the mission highly depends on the quality of the communication among the robots and the robots and the main controller. If communication is lost, the robots will lose contact with the main controller and the mission will likely fail. On the other hand, effective communication could actually enhance and increase the mission's success if it provided for a wider range of coverage, supported coordinated rescue operations and tele-operation, and guaranteed permanent connectivity despite network conditions and signal propagation effects. Communication among mobile robots and the main controller is currently known in the prior art to be achieved by using wireless local area networks (WLANs) based on the IEEE 802.11 standard.

The idea of using a WLAN of mobile robots in USAR operations has several drawbacks. First, WLANs require networking (access point) and energy (power outlet for access point) infrastructures, which are not readily available at disaster sites. Second, WLANs must be set up and configured, taking away precious search and rescue time. Third, communication performance is heavily affected by interferences, signal propagation effects, and the distance of the mobile nodes from the access point. 802.11 WLANs have an automatic fallback mechanism that reduces the transmission rate according to the quality of the transmission media. This feature makes the exploration of distant areas from the access point really difficult and risky. Finally, WLANs can't guarantee permanent connectivity. In USAR operations, mobile robots maneuvering the disaster site would need to maintain constant communication with a stationary controller, transmitting search findings and location information. The main controller is usually stationary and provides scope for teleoperation and analyzes findings of the robots to provide meaningful information to the relief workers. To ensure this constant communication with the main controller, the mobile robots and the main controller need to stay within the transmission range of the access point. Nodes moving beyond the transmission range of the access point are considered lost unless they use inherent position awareness protocols to trace route back to the main controller or work on an autonomous manner. Loss of robots not only produces financial loss but also jeopardize the mission's final success.

Most of the above mentioned issues could be resolved by forming a wireless mobile ad hoc network (MANET) of robots, where every node cooperates to provide connectivity and services. MANETs are self-organized and self-configured networks with multi-hop routing capabilities that operate without the need of any fixed infrastructure. Therefore, MANETs can be deployed and used rapidly, can drastically increase the area of coverage compared to WLANs, and can maintain communication with the main controller at all times in an easier manner, either by direct links or through intermediate nodes. MANETs may also reduce network congestion as routing remains distributed and the use of multi-hop routing may provide alternate routes for communication with the main controller.

Associated with these advantages and application possibilities are some inherent drawbacks that hold MANETs from being used as the communication platform of choice for semi-autonomous robots in USAR applications. For example, the nodes in an ad hoc network can move arbitrarily in a random direction and speed, which results in a very dynamic topology with frequent link breakages, disrupting communication among nodes and the main controller. Signal propagation effects in those harsh environments also cause communication problems. Nodes operating in ad hoc networks usually rely on batteries for energy, thus for these nodes energy-efficient protocols become a critical design criterion. Also, bandwidth utilization is another significant factor of concern, thus necessitating reduced routing overhead and good congestion control mechanisms.

By providing a constant communication link between the mobile robots and the main controller, it is ensured that the robots do not get lost. The term "node connectivity" is introduced here to denote the same. Node connectivity is defined as the ability of a node to continue or stop its mobility without breaking away from the network of nodes, while remaining in constant communication with the main controller. Forming an ad hoc network of the mobile robots and the main controller effectively addresses the issue of maximized area of coverage. By forming an ad hoc network, intermediate nodes act as a router forwarding packets towards the destination. By this method, robots continue their mobility beyond the transmission range of the main controller if an intermediate node exists through which it can establish a connection with the main controller. However, forming an ad hoc network of mobile robots does not address the issue of node connectivity. It is essential to ensure node connectivity in applications where loss of a node mobile robot in the case of urban and search and rescue operations could be detrimental to the performance of the system.

The vast majority of the research work done in the area of ad hoc networks has been focused on designing and developing routing protocols to address the issues of node mobility, overhead and energy efficiency. There has been an increased attention in developing routing protocols that consider the issue of link stability and the design of link stability based routing protocols, where routes to the destination are selected based on the strength of signals received from neighboring nodes or the duration for which the link has been active. It is well-known that there is no unique routing protocol that satisfies the requirements of all types of applications and rather, routing protocols are designed to optimize the performance of the application under consideration. For example, while an ad hoc network of laptops in a classroom presents low or no mobility and infrequent topology changes, the topology of an ad hoc network of nodes with random mobility in a military environment is highly dynamic. Similarly, the requirements for an ad hoc network of robots operating in urban search and rescue environments is different as robots have low but random mobility and work in unfriendly environments for signal propagation. The idea of applying ad hoc networking to a team of mobile robots is known in the art. The protocols known in the art include, Topology Broadcast based on Reverse-Path Forwarding (TBRPF), Ad hoc On-Demand Distance Vector (AODV), Associativity Based Routing (ABR), Temporally Ordered Routing Algorithm (TORA) and Zone Routing Protocol (ZRP). However, none of the prior art solutions are capable of guarantying node connectivity considering the energy available in the robots and the signal strength, a quite important characteristic for USAR applications where the final goal is to extend the area of coverage, avoid network partitions and loss of robots, and also extend the length of the mission under harsh signal propagation environments.

As illustrated in FIG. 1, a stationary main controller, and 6 mobile nodes (robots) are connected to form an ad hoc network. Robots 1, 2, 3 and 4 are within the transmission range of the main controller (denoted by a circle), while robots 5 and 6 are outside its transmission range. This doesn't necessarily mean that robots 5 and 6 have lost their communication with main controller. For example, robot 6 can still communicate with the main controller through robot 2. Here robot 2 acts as a router, transmitting packets to and from robot 6. Similarly robot 5 can transmit its packets to the main controller through robot 3 or 4. But as it can be seen, robot 2 is moving outside the transmission range of the main controller. This not only breaks the communication link between robot 2 and the main controller, but also the link between robot 6 and the main controller, as robot 2 was serving as the link between these two nodes. None of the existing routing protocols current known in the art address this issue as illustrated and described with reference to FIG. 1. None of the prior art routing protocols is able to ensure that in addition to the existing demands of ad hoc networks such as node mobility, link stability, energy efficiency and reduced routing overhead, that the requirement for node connectivity is satisfied.

Accordingly, what is needed in the art is a system and method that is effective in assuring node connectivity in an ad hoc network.

However, in view of the prior art considered as a whole at the time the present invention was made, it was not obvious to those of ordinary skill in the pertinent art how the identified need could be fulfilled.

SUMMARY OF INVENTION

In accordance with the present invention is provided a system and method effective in establishing a control layer algorithm that finds and maintains stable links among the mobile nodes and the main controller of an ad hoc network considering the energy of the nodes and the quality of the signal, thereby assuring node connectivity within the ad hoc network. In accordance with the present invention, the term "node connectivity" is defined as the ability of a node to continue or stop its mobility without breaking away from the network of nodes, while remaining in constant communication with the main controller.

The system and method in accordance with the present invention are implemented in a control layer that operates between the network and data link layers to provide for node connectivity. This modularity provides the flexibility of selecting the routing and link layer protocols that best suit the current application. In a particular embodiment, the control layer in accordance with the present invention is implemented on top of a MAC layer of the IEEE 802.11 type and below the Ad Hoc On-Demand Distance Vector (AODV) routing protocol.

In a particular embodiment in the field of mobile search and rescue, the present invention provides for synergy between communications and control by implementing a control layer algorithm that considers the energy level in mobile nodes and the quality of the received signals to control the mobility of the robots and guarantee continuous node connectivity, avoiding loss of robots and network partitions. Accordingly, the present invention guarantees node connectivity, increases the area of coverage and the throughput in the network with minimum extra overhead under different mobility patterns.

In accordance with the present invention is provided, a method to assure node connectivity in an ad hoc wireless network comprising a wireless main controller, a plurality of wireless nodes having a plurality of neighboring nodes and a plurality of wireless links connecting the wireless main controller, the plurality of wireless nodes and the plurality of neighboring nodes. The proposed method includes, computing a composite threshold for each of a plurality of neighboring nodes of a plurality of nodes, assigning a mobility to each of the plurality of nodes based on the composite threshold for each of the plurality of neighboring node and using the mobility assigned to each of the plurality of nodes to assure node connectivity in the ad hoc network.

The composite threshold in accordance with the present invention is computed for each of the plurality of neighboring nodes for a particular node by transmitting a hello signal from each of the plurality of nodes, the hello signal comprising an energy level and a signal power level, receiving a plurality of transmitted hello signals at each of the plurality of nodes, the plurality of transmitted hello signals received from each of the plurality of neighboring nodes, identifying the signal power level and the energy level for each of the plurality of transmitted hello signals received from each of the plurality of neighboring nodes, accessing an information table stored at each of the plurality of nodes and computing a composite threshold for each of the neighboring nodes based on the information table. As such, the composite threshold is a measure of the quality and stability of a wireless connection between a node and each of the neighboring nodes.

The information table in accordance with the present invention includes an entry for each of the plurality of neighboring nodes, a corresponding entry for the normalized energy level for each of the plurality of neighboring nodes and a corresponding entry for the normalized signal power level at which the hello packet was received from each of the neighboring nodes.

In computing a composite threshold for each of the neighboring nodes a weighting factor, ALPHA is used. ALPHA is determined by identifying the normalized energy level for each of the plurality of neighboring nodes, identifying the normalized signal power level for the hello signal received from each of the neighboring nodes and calculating the composite threshold for each of the neighboring nodes based on the following relationship:

$$\text{composite threshold} = (\text{weighting factor} * \text{normalized energy level}) + (1 - \text{weighting factor}) * \text{normalized signal power level})$$

The normalized energy level is equal to a ratio of the energy level of each of the plurality of neighboring nodes to a predetermined maximum possible energy level for the node and the normalized signal power level is equal to a ratio of the signal power level of each of the plurality of neighboring nodes to a predetermined maximum possible signal power level for the node. In particular, the predetermined maximum possible energy level for the node is equal to the energy value of a node battery when fully charged and the predetermined maximum possible signal power level for the node is equal to the signal power level between two nodes in close proximity and assuming ideal transmission conditions.

The weighting factor may be a dynamic weighting factor based on current network behavior or a static weighting factor.

Once the composite threshold values for each of the neighboring nodes have been determined, they are stored in update table at each of the plurality of nodes and the update table is transmitted to the main controller. As such, the update table contains an entry for each of the plurality of neighboring nodes and a corresponding entry for the composite threshold for each of the plurality of neighboring nodes.

In a particular embodiment, the method and system to assure node connectivity in accordance with the present invention are adapted to be implemented at a control layer, thereby operating between a routing layer and a data link layer. The routing layer may be selected from any number of routing protocols known in the art. In a particular embodiment, the routing layer selected is AODV protocol. Additionally, the data link layer may be selected from any number of data link layers known in the art and in a particular embodiment, the IEEE 802.11b MAC protocol is selected.

Assigning a mobility to each of the plurality of nodes is based on the composite threshold for each of the plurality of neighboring nodes and further includes the steps of, evaluating the composite threshold for each of the plurality of neighboring nodes received from each of the plurality of nodes to determine if each of the plurality of nodes has a link connection to the main control and assigning a mobility to stop the movement of the node if the node if is determined to not have a link connection to the main controller. The link connection between the node and the main controller may be a direct connection or a connection through a safe neighbor, such that the link connection is above the composite threshold for the node.

After the mobility of the node has been stopped, the mobility may be assigned to restart the movement of the node if the node is determined to have reestablished a link connection to the main controller or the a request may be made to move the node closer to the main controller.

In a particular embodiment of the present invention, a computer readable medium for providing instructions for directing a processor to carry out a method to assure node connectivity in an ad hoc wireless network comprising a wireless main controller, a plurality of wireless nodes having a plurality of neighboring nodes and a plurality of wireless links connecting the wireless main controller, the plurality of wireless nodes and the plurality of neighboring nodes is provided. The instructions including steps for computing a composite threshold for each of a plurality of neighboring nodes and transmitting the composite threshold for each of a plurality of neighboring nodes and means for assigning a mobility to each of the plurality of nodes based on the composite threshold for each of the plurality of neighboring nodes and transmitting the assigned mobility to each of the plurality of nodes to assure node connectivity in the ad hoc network.

As such, the present invention provides for the maintenance of a constant link between the mobile nodes and the main controller. The prevent invention provides additional benefits over the systems and methods currently known in the art.

The present invention provides for a minimal increase in routing overhead thereby reducing congestion in the network conserving the battery power of the nodes.

The present invention does not confine and restrict the area of coverage for providing node connectivity.

The present invention considers the energy of each of the mobile nodes; as a node might be well within the transmission range of the main controller, yet have very little or no battery life. Such nodes should not be used to relay packets and should return to the main controller.

The present invention provides for nodes at the threshold of a connection to stop their mobility if breaking away from this connection would disrupt the node's communication with the main controller. For example, robot 2 in FIG. 1 is at threshold, as its direction of movement is away from the main controller. Its mobility would break its connection with the main controller as well as the connection of robot 6 with the main controller, since robot 2 connects robot 6.

The present invention provides a means for nodes to constantly monitor the signal strength of the packets received from the neighboring nodes.

Accordingly, the present invention guarantees node connectivity, increases the area of coverage and the throughput in the network with minimum extra overhead under different mobility patterns.

BRIEF DESCRIPTION OF THE DRAWINGS

For a fuller understanding of the invention, reference should be made to the following detailed description, taken in connection with the accompanying drawings, in which:

FIG. 4 is an exemplary information table in accordance with an embodiment of the present invention.

FIG. 6 is a table showing the illustrative data for the example at time t=1 s.

FIG. 7 is a table illustrating the update table generated at each of the individual nodes in the illustrative example at time t=1.2 s.

FIG. 8 is a table illustrating the data structure at the main controller in the illustrative example at time t=1.2 s.

FIG. 10 is a table illustrating the information table at time t=50 s for the illustrative example.

FIG. 11 is a table illustrating the update table at time t=50.4 s for the illustrative example.

FIG. 12 is a table illustrating the data structure at the main controller at time t=50.4 s for the illustrative example.

FIG. 14 is a table illustrating the information table at time t=100 s for the illustrative example.

FIG. 15 is a table illustrating the update table at time t=100.8 s for the illustrative example.

FIG. 16 is a table illustrating the data structure at the main controller at time t=100.8 s for the illustrative example.

DETAILED DESCRIPTION OF THE PREFERRED EMBODIMENT

The present invention provides a system and method for the exchange of control message among mobile nodes and a main controller and the ability to stop the mobility of the robots when their connections with the main controller, either directly or through another mobile node, are in danger of being lost. The decision to stop the mobility of a node is based on the signal strength and the energy level of the surrounding nodes.

Figure 1:
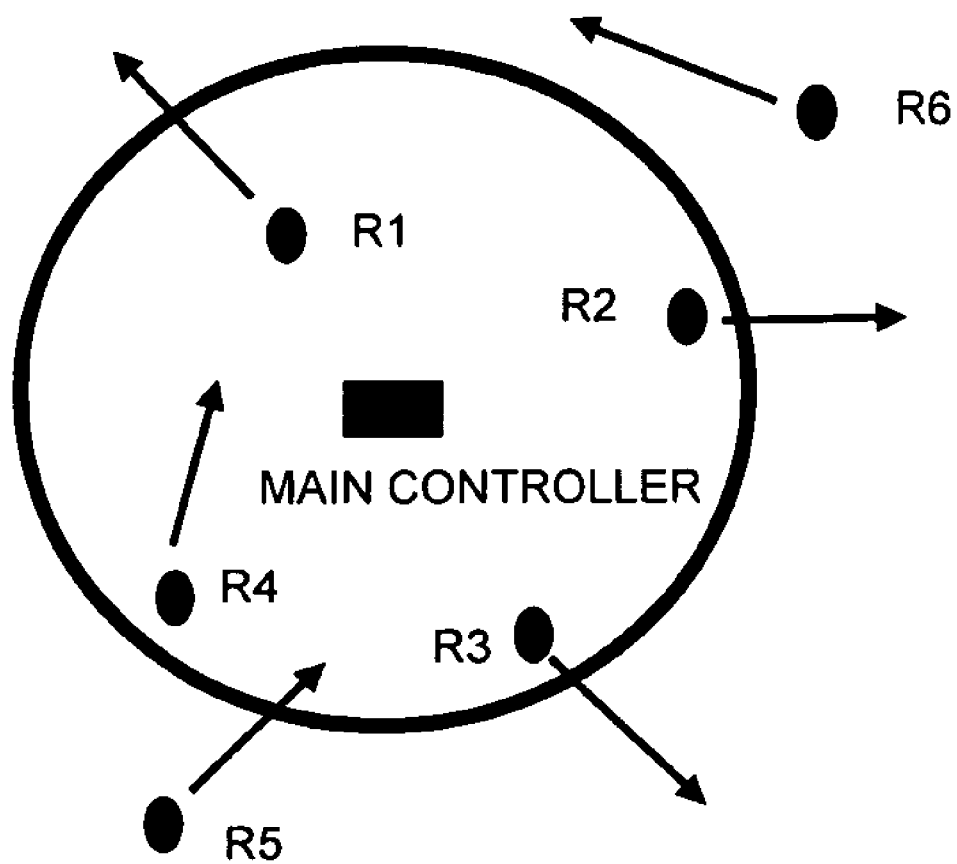
FIG. 1 is an illustrative embodiment of an exemplary ad hoc network topology in accordance with the present invention.
Figure 2:
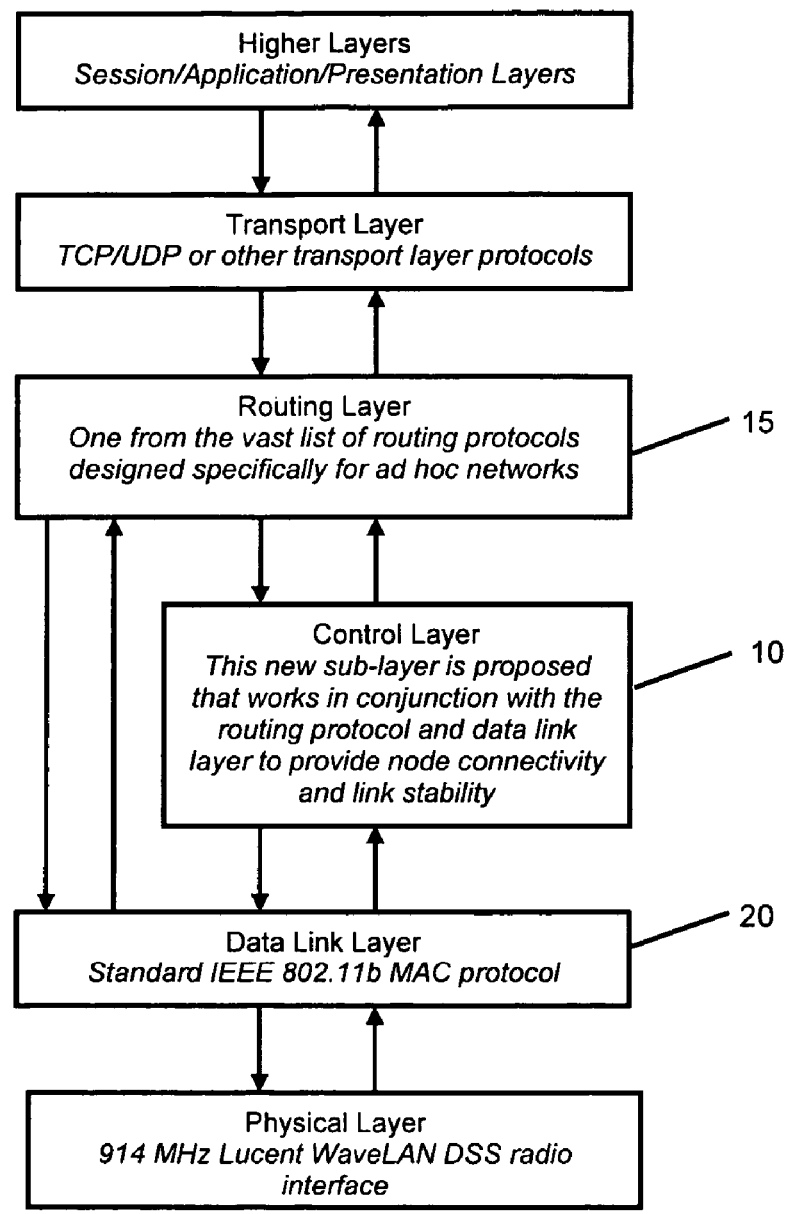
FIG. 2 is an illustration of the layered approach to implement the control layer method and system in accordance with the present invention.

With reference to FIG. 2, the present invention is implemented in a control layer 10 that operates between the network routing layer 15 and data link layers 20 to provide for node connectivity.

In a particular embodiment, the robots and the main controller are deployed at the same location at the start of a search and rescue operation. The main controller remains stationary throughout the entire operation and the robots begin to explore the disaster zone.

Figure 3:
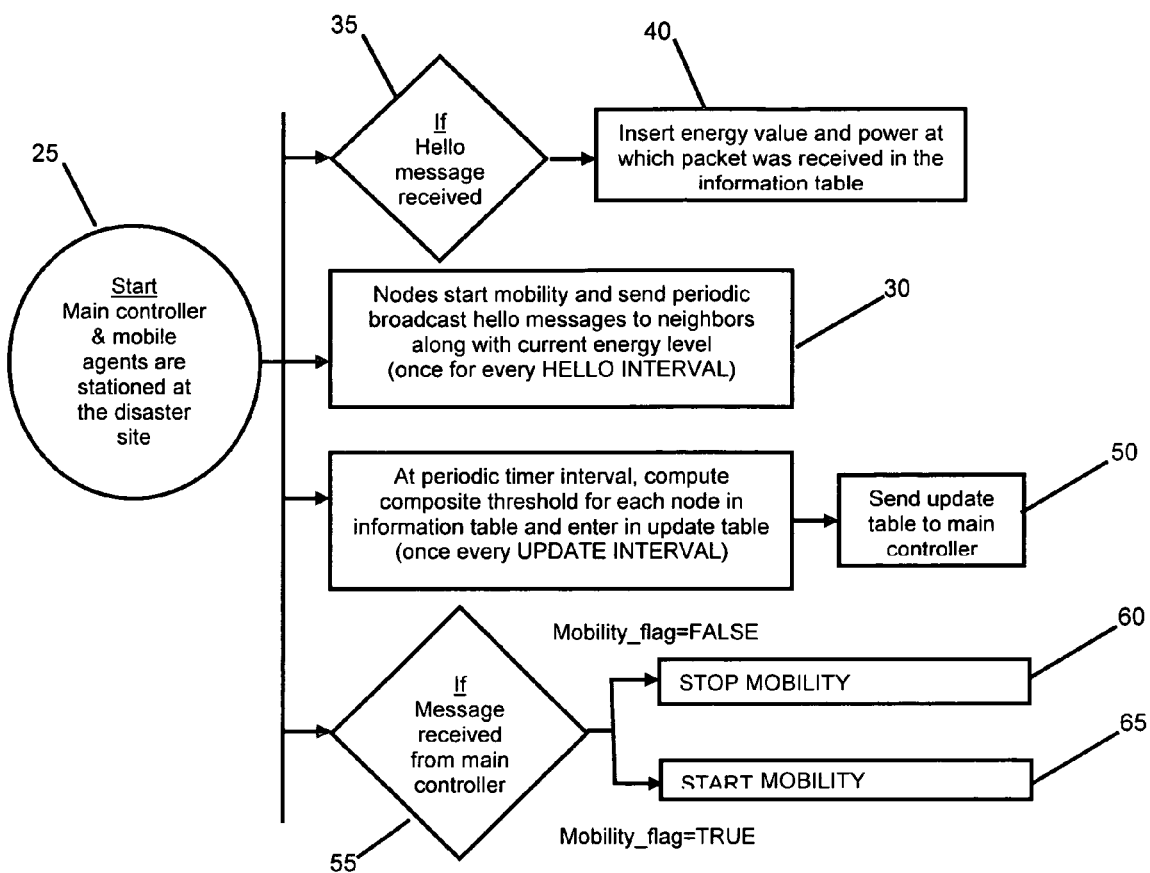
FIG. 3 is a flow diagram illustrating the logic flow at each of the nodes in accordance with the present invention.

Referring to FIG. 3, which illustrates the flow diagram illustrating the logic at the local nodes in accordance with the present invention, after the main controller and the mobile nodes are stationed at the disaster site 25, every mobile node broadcasts a periodic hello message with its energy information in a standard packet format 30. The hello messages are exchanged based on a predetermined interval. The node receiving a broadcast message does not forward the packet, thus the packet is delivered only to the nodes that are within the transmission radius of the sender node. Each node that receives the hello messages 35 from its neighbors, calculates the signal strength at which the packet was received and inserts the energy value and power at which the packet was received in an information table 40. An information table is maintained at every node, where, for each node in the network an entry is maintained. This table has fields corresponding to the neighboring node id, its normalized energy level, and the normalized power level at which the hello packet was received from that node. At periodic intervals every node in the network, computes the composite threshold for each of its neighboring nodes, based on the values in the information table 45. The composite threshold refers to a combined value of energy and signal strength calculated using the following relationship:

$$((alpha * normalized\_energylevel) + (1-alpha) * normalized\_powerlevel)$$

where ALPHA is a weighting factor determined by the system.

In determining the values for the normalized_energylevel and the normalized_powerlevel, the battery power and signal power values stored in the information table of the nodes need to be normalized to the same scale before being used in the above given equation. The battery power is measured in joules and is usually a positive number in the range of zero to the maximum power of the battery. The signal strength is measured in decibels and is of the order of $10^{-x}$, where the range of x depends on the wireless interface and other channel parameters. The battery power and the signal strength are converted to ratios, denoted as a fraction of the maximum energy and maximum signal strength possible according to the following relationship:

normalized_energylevel=energy of neighboring node÷maximum energy possible for this node normalized_powerlevel=signal strength for this link÷maximum signal strength possible for any link from this node The maximum possible values for node energy and signal strength of any link are pre-determined and remain constant for the entire duration of the application. The maximum possible value for the energy level would be the energy value of the batteries when fully charged. And the maximum possible value for signal strength for any link would be the signal power level calculated between two nodes that are very close to each other assuming ideal transmission conditions.

The value of ALPHA may be static or dynamic. A static value of ALPHA provides a constant weight factor for the energy and power levels of nodes and links, irrespective of the current nodes and network conditions. A more appropriate strategy is to dynamically change the value of ALPHA to adapt the calculation to reflect current network behavior. For example, at the start of the simulation, all nodes have energy values close to the maximum. In this case, it would be better to have a small ALPHA value, e.g. 0.1, thus giving more weight to the neighboring link power level. Similarly, when all the nodes are in close proximity to the main controller, the signal strength of the received packets would be close to maximum. An ALPHA value of 0.8 would be better, as the calculated composite threshold will be more biased toward energy values. To illustrate this aspect further, let us consider a more numerical example. Let us assume a network of 5 nodes and a main controller, with static a value of 0.5 at each node. With reference to the table in FIG. 4, the values in the information table at node 1 along with their composite threshold values are given. As it can be seen from the table, node 4 has the best link with this node (normalized signal power of 0.63), while neighbor node 2 has the most energy (normalized energy value of 0.92). The table also shows the composite threshold for the neighbors of node 1, calculated with a=0.5. This results in node 2 having the maximum value for composite threshold, and being chosen as the immediate parent for this node. The parent node is just the node having the maximum value for composite threshold among all the neighbors of a node and indicates the presence of a neighbor node through which a node can communicate with the main controller. In this case, it would have been better to choose node 4 as the parent node since it had better signal strength. An ALPHA value of 0.1 would have biased the calculation of composite threshold to the node with better power level, while an ALPHA value of 0.9 would have biased the calculation to the neighbor node with better energy level. Thus, in order to balance the biasing factor, ALPHA values are dynamically estimated. Each node has its own ALPHA value and is estimated based on the previous ALPHA value and the current data in the information table. The procedure is listed as an algorithm below and is run once every time the update table is updated by the nodes and sent to the main controller.

It is to be noted that the energy and power level values of the node with maximum composite threshold need not necessarily be the maximum energy and power level values. Thus, if the maximum energy value in the information table is greater than the energy value of the node with the maximum composite threshold. ALPHA value is increased by the fraction of the difference between these two values. An increase in ALPHA value would result in higher weighting for the energy values in the computation of composite threshold. Similarly, if the maximum value for power level in the information table is greater than the power level of the node with maximum composite threshold, ALPHA value is decreased by the fraction of difference between these two values.

Referring again to FIG. 3, once determined, the value of the composite threshold is stored along with the corresponding neighbor id in the update table. Each node then forwards its update table to the main controller 50. The main controller receives update tables from all nodes at periodic intervals and performs a local computation on each of the received tables to see if every node in the network has a connection to the main controller 50. The main controller loops through every node in the network to check if it has a direct connection with the main controller or through any other intermediate node, or if it has such a connection, but is at the link threshold. The link threshold is the minimum composite threshold for the network below which the link is considered a weak link. The main controller sends a message to these nodes 55, with its mobility flag set to false, thereby stopping the mobility of the node. Nodes that receive messages from the main controller with its mobility flag set to false, stop their mobility 60 (if not stopped already), and wait for a certain period of time to see if it receives a message from the main controller with mobility flag set to true, in which case it continues its mobility 65. If this wait time expires, and the nodes do not receive a message from the main controller with mobility flag set to true, they begin to move towards the main controller as a preemptive measure.

In a specific embodiment, the main controller receives update tables from every node in the network once every predetermined update interval, wherein the predetermined interval is the time interval between successive update packets sent by the individual nodes. The information in these tables is copied into a data structure maintained at the main controller. For each node in the network the main controller maintains a data structure comprising the number of neighbors of that node, mobility flag that specifies if that node is mobile or not, an array of neighbor id's, composite threshold values and the sequence number of the update packet expected from that node. Use of sequence numbers for update packets is similar to the implementation of sequence numbers for TCP packets. Entries in this data structure are modified as and when update packets are received.

The main controller runs an algorithm once every predetermined interval to check for mobility status of every node in the network, wherein the predetermined interval is the time interval between successive loops through the algorithm at them main controller to check for mobility status of the nodes in the network. The algorithm loops through the information table of every node in the network, and checks for a connection to the main controller that is above the composite threshold. If no such link exists, then it finds the neighbor of this node that has the maximum value of composite threshold and looks in the information table of the neighbor node for a connection (The node that has the maximum value of composite threshold among all neighbors, should have its composite threshold greater than the link threshold). The algorithm stops the mobility of the mobile node, if after recursively iterating through the information table of all neighbors, it does not find a direct or multi-hop connection to the main controller.

If there is no direct link between any of the nodes and the main controller, the algorithm recursively loops through every safe neighbor to find a link to the main controller. Safe neighbors are neighbor nodes that have a composite threshold value greater than link threshold. This ensures maximum safe area of coverage without loosing contact with the main controller. By making sure that all nodes have a direct or routed link to the main controller, the algorithm also ensures that there is a communication link between individual nodes, i.e. a tree structure of the network is always maintained.

Accordingly, in a particular embodiment, the present invention uses a centralized mechanism to monitor the mobility of the nodes, and all nodes use the underlying distributed ad hoc routing protocol to exchange hello packets and send the computed information table to the main controller. However, it is the main controller that decides on the mobility of all the nodes based on the data in the information table, and hence this approach is classified as centralized.

In a particular embodiment, the present invention utilizes AODV as the routing layer protocol to provide for routing information between nodes. The forwarding of update tables to the main controller once every predetermined interval relies on the underlying routing protocol for the transmission. The functionalities at the MAC layer required by an ad hoc network control layer are very similar to that required by a wireless network. In a specific embodiment, the IEEE 802.11 standard for wireless LAN's is chosen as the Medium Access Control (MAC) layer protocol, while the routing layer protocol is chosen from one of the several protocol designed specifically for ad hoc networks. This specific embodiment is not meant to be limiting and other routing layer protocols and wireless network protocols are within the scope of the present invention.

Several variations are possible regarding the responsibilities of the main controller and the mobile nodes. In an additional embodiment of the invention, the proposed control layer is modified to work in a completely distributed manner. For instance, instead of computing the composite threshold at every node and sending this information to the main controller in an update table, each node could send its information table (consisting of neighbor id, energy level of the neighbor, and received signal power level), and the ALPHA value, and leave the computation to the main controller. This could help in reducing the computation time at the individual nodes at the expense of an increase in the routing overhead.

In yet another embodiment, the control layer algorithm can also be modified so that the mobile nodes can have complete mobility control. Instead of having the main controller validate the mobility of nodes by iterating through the update tables received from each node, the network could be flooded with update tables from each node, so that every node in the network has a copy of the update table of the other nodes. By doing this, the control of deciding on mobility is left entirely to the individual nodes rather than to the main controller.

Figure 5:
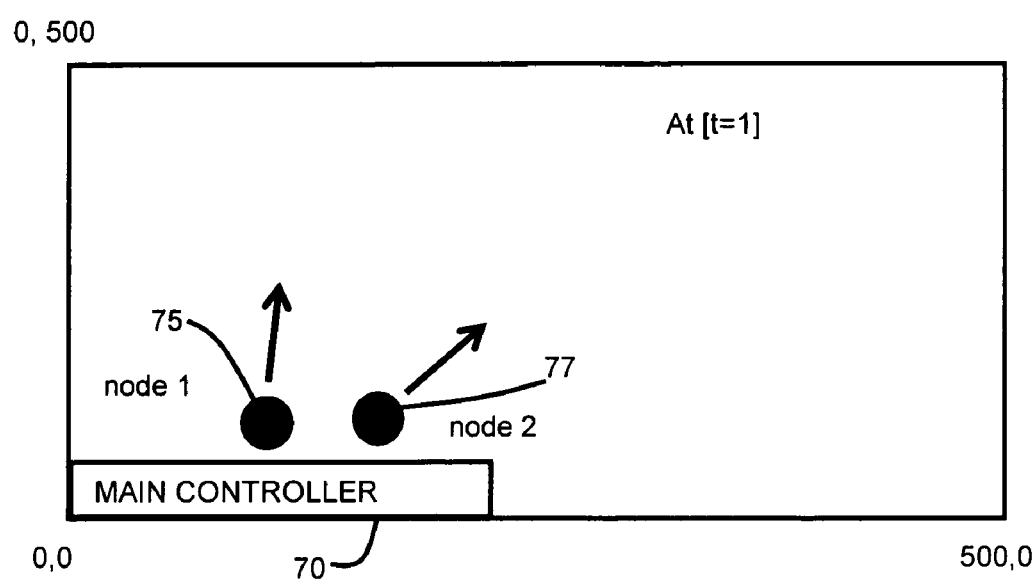
FIG. 5 is a diagrammatic view of an exemplary network topology for an illustrative example in accordance with the present invention at time t=1 s.

In accordance with an exemplary embodiment of the present invention, consider the example of a 700 m×500 m disaster site being explored with a main controller 70 and 2 mobile robots, Node 1 75 and Node 2 77, as shown with referenced to FIG. 5. The main controller remains stationary during the entire course of the search and rescue operations. All three nodes exchange hello packets containing the node energy value, once every predetermined interval. The information table is maintained at each node and stores this energy information for its neighbors, along with the power level at which the packet was received. The power level of the received packets is used as an estimator of signal strength. Assuming the transmission range for a node to be 250 m, and a link threshold of 0.32, wherein the link threshold is the minimum value for the composite threshold, below which a link is considered to be a weak link. Let the interval between successive hello signals be 1 second, the interval between update tables sent to the main controller to be 1.2 seconds, and interval between the main controller monitoring the update table sent from the nodes to be 1.5 seconds. Also, ALPHA is set to 0.5 at all nodes, implying a constant weight factor between energy and power. The table as shown in FIG. 5 illustrates the values in the information table at node 1, along with their composite threshold values. Assume all nodes move at a speed of 4 meters per second in a specific direction. Thus assuming that the nodes travel in a straight direction, they would be out of the transmission range of the main controller in 50 seconds. Nodes 1 and 2 are close to the main controller and their direction of movement is indicated. Hello messages are exchanged between the nodes, and data in the information table gets updated for each received hello message. The table of FIG. 6 shows the data stored in information table at time t=1. It is to be noted that energy and signal power values are normalized as previously explained, while updating the contents of the information table. At time t=1.2 s the function call to send the update table is evoked, that calculates composite threshold, estimates ALPHA value, and sends the update table to the main controller 70. Using the equation for composite threshold previous given, the update tables are generated at the individual nodes as shown with reference to the table of FIG. 7.

To further illustrate the calculation of composite threshold, let us take the example of node 1. Node 2 is a neighbor of node 1 with energy level of 0.95 and signal power of 0.9. Hence the composite threshold for this neighbor of node 1 would be:

$$(0.5*0.95)+(0.5*0.9) \text{ which is } 0.925$$

After calculation of the composite threshold, each node estimates its ALPHA value. At node 1, the neighbor that has the maximum value for composite threshold is the main controller (from update table). Thus the best_energylevel and best_powerlevel correspond to the energy and signal power values of this node, i.e, 0.96 and 0.92 respectively. Also, from the information table, it can be seen that the local_maxenergy and local_maxpower correspond to the values of the main controller. This implies that the current value of ALPHA is properly biased between energy and signal strength, and thus the ALPHA value for this node remains the same. Again among the neighbors of node 2, the main controller has the maximum value for composite threshold. Variables best_energylevel and best_powerlevel correspond to values 0.93 and 0.9 respectively. But the values for local_maxenergy and local_maxpower correspond to 0.95 and 0.9 respectively. Despite having a greater energy value, node 1 doesn't have the maximum composite threshold value. Thus the alpha value is biased to give more weight to the energy value in the calculation of composite threshold. Since max(normalized energy)>normalized energy of node with max(composite threshold), $$\text{ALPHA=ALPHA+(1-best\_energylevel/local\_maxenergy)=}\\0.5+(1-0.93/0.95)=0.521$$

The ALPHA value for node 1 remains at 0.5, while node 2 now has an ALPHA value of 0.521, increased weight for energy value of neighbors. After ALPHA estimation, each node sends its update table to the main controller. On receiving these tables from the individual nodes, the main controller updates its data structure to reflect the current network topology. Thus at t=1.2 s, the main controller has a data structure similar to that of the table shown in FIG. 8. At every predetermined interval (=1.5 in this case) the main controller runs its local algorithm to check for links from all nodes to itself. From the table in FIG. 8, it can be seen that nodes 1 and 2, both have a direct connection with the main controller, and is above the link threshold (=0.32). So both nodes can remain mobile, and the mobility flag for these nodes is set to true.

Figure 9:
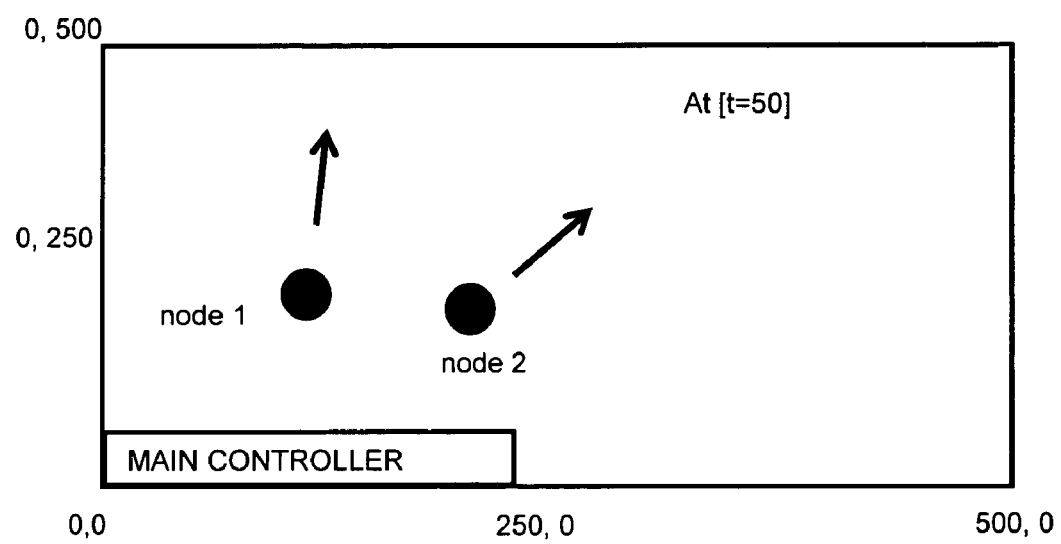
FIG. 9 is a diagrammatic view illustrating the network topology of the illustrative example at time t=50 s.

FIG. 9 represents the network topology at time t=50.0 s. The table shown in FIG. 10 illustrates the information table at nodes 1 and 2, updated based on the hello messages received from their neighbors at time t=50.0 seconds. Again at t=50.4 s, the function call to update table is evoked. Since ALPHA values are dynamically estimated every UPDATE INTERVAL, using the value of 0.5 and 0.521 for nodes 1 and 2, estimated at t=1.2 s would not be appropriate. Thus ALPHA is assumed to be 0.2 at t=50.0 s. The generated update table is shown in the table of FIG. 11. ALPHA values are estimated in the same way as in the previous case and is not shown here. At t=50.4 s, the nodes forward their update tables to the main controller, where the local data structure is updated based on the data received from the nodes in the network. The updated data structure at the main controller is shown in the table of FIG. 12.

The main controller executes its local algorithm at again at t=51 s. As can be seen from the table of FIG. 12, node 1 has a direction with the main controller, but the composite threshold value is at the link threshold. So the algorithm loops through the update tables of other neighbors of this node, which have a composite threshold value greater than link threshold, for a connection to the main controller. The only other neighbor for node 1 is node 2, and its composite threshold value is greater than link threshold. Hence the algorithm checks the neighbors list of node 2 for a strong link to the main controller. But node 2 has an even weaker connection to main controller (composite threshold=0.24), and hence the algorithm stops the mobility of node 1 since its only connection to the main controller is at threshold. The mobility flag of node 1 is set to false, and a message is sent to the node with the mobility flag.

Similarly, the algorithm looks for a connection from node 2 to the main controller. The direct link from node 2 to the main controller is below the link threshold (=0.24), and the algorithm checks for a connection to main controller through other neighbors of this node which have threshold values greater than link threshold. Neighbor node 1 has a connection with the main controller, which is at link threshold. But since its mobility has already been stopped, and is not in danger of breaking away from the main controller, the algorithm sets node 1 as the parent node of 2, and node 2 continues to have its mobility flag set to true.

Figure 13:
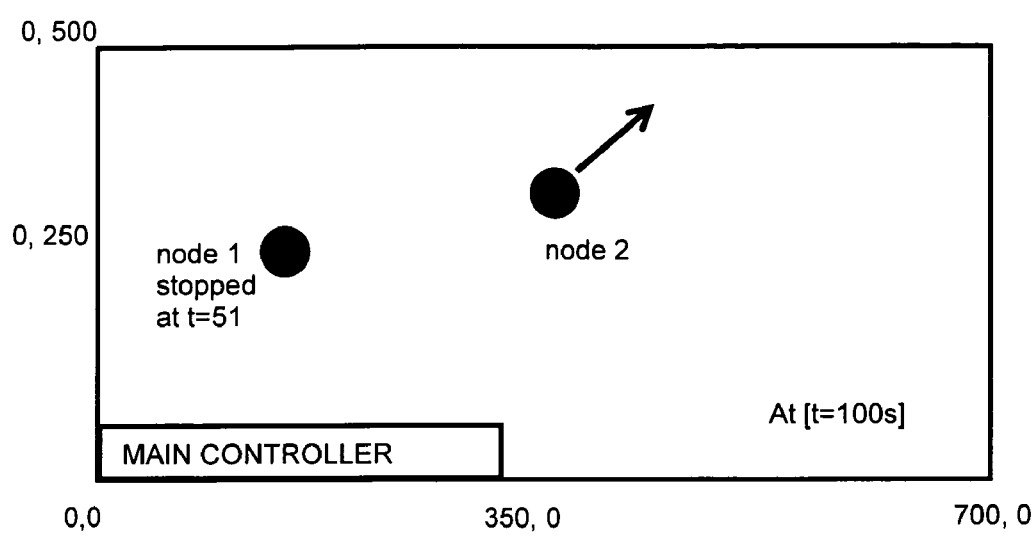
FIG. 13 is a diagrammatic view illustrating the network topology of the illustrative example at time t=100 s.

FIG. 13 presents the network topology at t=100 s. It is to be remembered that node 1 has its mobility flag set to false, and node 2 has its mobility based on node 1, i.e. node 2 has a link to the main controller through node 1. ALPHA value is assumed to be 0.3 at t=100 s.

Based on the hello messages exchanged between the nodes at t=100 s, the information table of each node gets updated and is shown in the table of FIG. 14. It is to be noted that there is no entry for the main controller in the table of node 2, and this is due to the fact that node 2 has moved well beyond the transmission range of main controller and the hello messages broadcasted by the main controller are not received at node 2. At t=100.4 s, the update table function is evoked by every node, which generates the update table shown in FIG. 15 for that node, estimates ALPHA value and sends out the update table to main controller. The contents of the data structure at the main controller get updated on receiving these tables form the mobile nodes and are shown in the table of FIG. 16. Node 1 has its mobility flag set to false and the algorithm at the main controller is not able to find any better link to the main controller (this occurs if a node with a strong link to the main controller moves within the transmission range of node 1). But, node 2 now has only one neighbor, node 1 and this link has a composite threshold value equal to link threshold. Node 2 can still communicate with the main controller through node 1, but both the links are at threshold limits.

The algorithm at the main controller iterates through the data collected from update tables and checks for mobility of the nodes. A timer is attached to every node to keep track of the duration for which it has been stopped. Based on this time value, the main controller can issue callback functions to the nodes requesting them to move towards the base.

This detailed exemplary embodiment is illustrative in nature and is not intended to limit the scope of the present invention.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method to assure node connectivity in an ad hoc wireless network comprising a wireless main controller, a plurality of wireless nodes having a plurality of neighboring nodes and a plurality of wireless links connecting the wireless main controller, the plurality of wireless nodes and the plurality of neighboring nodes, the method comprising:

computing a composite threshold for each of a plurality of neighboring nodes of a plurality of nodes, wherein computing the composite threshold further comprises;
identifying an energy level and a signal power level for each of the plurality of nodes;
determining a weighting factor;
identifying a normalized energy level for each of the plurality of neighboring nodes;
identifying a normalized signal power level for each of the plurality of neighboring nodes;
calculating the composite threshold for each of the neighboring nodes based on the relationship:

composite threshold=(weighting factor*normalized energy level)+(1-weighting factor)*normalized signal power level)

assigning a mobility to each of the plurality of nodes based on the composite threshold for each of the plurality of neighboring nodes; and
using the mobility assigned to each of the plurality of nodes to assure node connectivity in the ad hoc network.

2. The method of claim 1, wherein the composite threshold for each of a plurality of neighboring nodes of a plurality of nodes is computed at each of the plurality of nodes and the composite threshold for each of the plurality of neighboring nodes is transmitted to a main controller.

3. The method of claim 1, wherein the composite threshold for each of a plurality of neighboring nodes of a plurality of nodes is computed at a main controller.

4. The method of claim 1, wherein the mobility is assigned to each of the plurality of nodes at each of the plurality of nodes.

5. The method of claim 1, wherein the mobility is assigned to each of the plurality of nodes at a main controller and the assigned mobility is transmitted to each of the plurality of nodes.

6. The method of claim 1, wherein the step of computing a composite threshold for each of a plurality of neighboring nodes further comprises:
   transmitting a hello signal from each of the plurality of nodes, the hello signal comprising the energy level and the signal power level;
   receiving the plurality of transmitted hello signals at each of the plurality of nodes, the plurality of transmitted hello signals received from each of the plurality of neighboring nodes;
   identifying the signal power level and the energy level for each of the plurality of transmitted hello signals received from each of the plurality of neighboring nodes;
   accessing an information table stored at each of the plurality of nodes; and
   computing the composite threshold for each of the neighboring nodes based on the information table.

7. The method of claim 6, wherein the information table further comprises an entry for each of the plurality of neighboring nodes, a corresponding entry for the normalized energy level for each of the plurality of neighboring nodes and a corresponding entry for the normalized signal power level at which the hello packet was received from each of the neighboring nodes.

8. The method of claim 6, wherein the step of computing a composite threshold for each of the neighboring nodes further comprises measuring the quality and stability of a wireless connection between a node and each of the neighboring nodes.

9. The method of claim 1, wherein the normalized energy level is equal to a ratio of the energy level of each of the plurality of neighboring nodes to a predetermined maximum possible energy level for the node.

10. The method of claim 1, wherein the normalized signal power level is equal to a ratio of the signal power level of each of the plurality of neighboring nodes to a predetermined maximum possible signal power level for the node.

11. The method of claim 9, wherein the predetermined maximum possible energy level for the node is equal to the energy value of a node battery when fully charged.

12. The method of claim 10, wherein the predetermined maximum possible signal power level for the node is equal to the signal power level between two nodes in close proximity and assuming ideal transmission conditions.

13. The method of claim 1, wherein the weighting factor is a dynamic weighting factor based on current network behavior.

14. The method of claim 1, wherein the weighting factor is a static weighting factor.

15. The method of claim 6, further comprising the step of storing the composite threshold for each of the neighboring nodes in an update table at each of the plurality of nodes and transmitting the update table from each of the plurality of nodes to the main controller.

16. The method of claim 15, wherein the update table comprises an entry for each of the plurality of neighboring nodes and a corresponding entry for the composite threshold for each of the plurality of neighboring nodes.

17. The method of claim 1, wherein the method to assure node connectivity is a control layer method operating between a routing layer and a data link layer.

18. The method of claim 17, wherein the routing layer utilizes an ad hoc on-demand distance vector (AODV) protocol.

19. The method of claim 17, wherein the data link layer is an IEEE 802.11b MAC protocol.

20. The method of claim 1, wherein the plurality of neighboring nodes are identified from the plurality of nodes as being within a transmission range of each of the plurality of nodes.

21. The method of claim 1, wherein the step of computing a composite threshold for each of the plurality of neighboring nodes is repeated at a predetermined interval.

22. The method of claim 1, wherein the step of assigning a mobility to each of the plurality of nodes based on the composite threshold for each of the plurality of neighboring nodes is repeated at a predetermined interval.

23. The method of claim 1, wherein the step of assigning a mobility to each of the plurality of nodes based on the composite threshold for each of the plurality of neighboring nodes further comprises:
   evaluating the composite threshold for each of the plurality of neighboring nodes received from each of the plurality of nodes to determine if each of the plurality of nodes has a link connection to the main controller; and
   assigning a mobility to stop the movement of the node if the node if is determined to not have a link connection to the main controller.

24. The method of claim 23, wherein the link connection between the node and the main controller is a direct connection.

25. The method of claim 23, wherein the link connection between the node and the main controller is through a safe neighbor connection.

26. The method of claim 23, wherein a link connection is identified as being a link connection above the composite threshold for the node.

27. The method of claim 23, wherein the mobility is assigned to restart the movement of the node if the node is determined to have a link connection to the main controller.

28. The method of claim 23, wherein the mobility is assigned to request that the node move closer to the main controller.

29. A system to assure node connectivity in an ad hoc wireless network comprising a wireless main controller, a plurality of wireless nodes having a plurality of neighboring nodes and a plurality of wireless links connecting the wireless main controller, the plurality of wireless nodes and the plurality of neighboring nodes, the system comprising:
   means for computing a composite threshold for each of a plurality of neighboring nodes of a plurality of nodes, wherein the means for computing a composite threshold further comprises means for;
   identifying an energy level and a signal power level for each of the plurality of nodes;
   determining a weighting factor;
   identifying a normalized energy level for each of the plurality of neighboring nodes;
   identifying a normalized signal power level for each of the plurality of neighboring nodes;
   calculating the composite threshold for each of the neighboring nodes based on the relationship:

composite threshold=(weighting factor*normalized energy level)+(1-weighting factor)*normalized signal power level); and means for assigning a mobility to each of the plurality of nodes based on the composite threshold for each of the plurality of neighboring nodes; and means for using the mobility assigned to each of the plurality of nodes to assure node connectivity in the ad hoc network.

30. The system of claim 29, wherein the plurality of nodes for computing the composite threshold for each of a plurality of neighboring nodes further comprises:

means for transmitting a hello signal from each of the plurality of nodes, the hello signal comprising the energy level and the signal power level;

means for receiving a plurality of transmitted hello signals at each of the plurality of nodes, the plurality of transmitted hello signals received from each of the plurality of neighboring nodes;

means for identifying the signal power level and the energy level for each of the plurality of transmitted hello signals received from each of the plurality of neighboring nodes;

means for accessing an information table stored at each of the plurality of nodes;

means for computing a composite threshold for each of the neighboring nodes based on the information table; and means for storing the composite threshold for each of the neighboring nodes in an update table at each of the plurality of nodes and transmitting the update table from each of the plurality of nodes to the main controller.

31. The system of claim 29, wherein the means for assigning a mobility to each of the plurality of nodes based on the composite threshold for each of the plurality of neighboring nodes further comprises:

means for evaluating the update table received from each of the plurality of nodes to determine if each of the plurality of nodes has a link connection to the main controller; and means for assigning a mobility to a node based on the link connection to the main controller.

32. A system to assure node connectivity in an ad hoc wireless network comprising a wireless main controller, a plurality of wireless nodes having a plurality of neighboring nodes and a plurality of wireless links connecting the wireless main controller, the plurality of wireless nodes and the plurality of neighboring nodes, the system comprising:

a plurality of nodes for computing a composite threshold for each of a plurality of neighboring nodes and transmitting the composite threshold for each of a plurality of neighboring nodes to a main controller, wherein the composite threshold is computed by;

identifying an energy level and a signal power level for each of the plurality of nodes;

determining a weighting factor;

identifying a normalized energy level for each of the plurality of neighboring nodes;

identifying a normalized signal power level for each of the plurality of neighboring nodes;

calculating the composite threshold for each of the neighboring nodes based on the relationship:

composite threshold=(weighting factor*normalized energy level)+(1-weighting factor)*normalized signal power level); and a main controller for assigning a mobility to each of the plurality of nodes based on the composite threshold for each of the plurality of neighboring nodes and transmitting the assigned mobility to each of the plurality of nodes to assure node connectivity in the ad hoc network.

33. A computer readable medium for providing instructions for directing a processor to carry out a method to assure node connectivity in an ad hoc wireless network comprising a wireless main controller, a plurality of wireless nodes having a plurality of neighboring nodes and a plurality of wireless links connecting the wireless main controller, the plurality of wireless nodes and the plurality of neighboring nodes, the instructions including steps for computing a composite threshold for each of a plurality of neighboring nodes by identifying an energy level and a signal power level for each of the plurality of nodes, determining a weighting factor, identifying a normalized energy level for each of the plurality of neighboring nodes, identifying a normalized signal power level for each of the plurality of neighboring nodes, calculating the composite threshold for each of the neighboring nodes based on the relationship: composite threshold=(weighting factor*normalized energy level)+(1-weighting factor)*normalized signal power level), and transmitting the composite threshold for each of a plurality of neighboring nodes and means for assigning a mobility to each of the plurality of nodes based on the composite threshold for each of the plurality of neighboring nodes and transmitting the assigned mobility to each of the plurality of nodes to assure node connectivity in the ad hoc network.

* * * * *